US008986571B2

(12) United States Patent
Watanabe et al.

(10) Patent No.: US 8,986,571 B2
(45) Date of Patent: Mar. 24, 2015

(54) LITHIUM COMPOSITE COMPOUND PARTICLES AND PROCESS FOR PRODUCING THE SAME, AND NON-AQUEOUS ELECTROLYTE SECONDARY BATTERY

(75) Inventors: Hiroyasu Watanabe, Fukuoka-ken (JP); Kazutoshi Ishizaki, Fukuoka-ken (JP); Taiki Imahashi, Fukuoka-ken (JP); Satoshi Nakamura, Fukuoka-ken (JP); Osamu Sasaki, Fukuoka-ken (JP)

(73) Assignee: Toda Kogyo Corporation, Otake (JP)

( * ) Notice: Subject to any disclaimer, the term of this patent is extended or adjusted under 35 U.S.C. 154(b) by 227 days.

(21) Appl. No.: 13/702,871

(22) PCT Filed: Jun. 8, 2011

(86) PCT No.: PCT/JP2011/063126
§ 371 (c)(1),
(2), (4) Date: Jan. 22, 2013

(87) PCT Pub. No.: WO2011/155523
PCT Pub. Date: Dec. 15, 2011

(65) Prior Publication Data
US 2013/0119307 A1    May 16, 2013

(30) Foreign Application Priority Data
Jun. 9, 2010 (JP) .................................. 2010-132392

(51) Int. Cl.
*H01M 4/525* (2010.01)
*H01M 4/505* (2010.01)
*C01G 53/00* (2006.01)

(52) U.S. Cl.
CPC ............. *H01M 4/525* (2013.01); *H01M 4/505* (2013.01); *Y02E 60/122* (2013.01); *C01G 53/50* (2013.01); *C01P 2004/03* (2013.01); *C01P 2004/61* (2013.01); *C01P 2006/12* (2013.01); *C01P 2006/80* (2013.01)
USPC ...................................... 252/182.1; 429/223

(58) Field of Classification Search
CPC ..................................................... H01M 4/525
USPC ......................................... 252/182.1; 429/223
See application file for complete search history.

(56) References Cited

U.S. PATENT DOCUMENTS

| | | | | |
|---|---|---|---|---|
| 5,264,201 A | * | 11/1993 | Dahn et al. ................. | 252/519.1 |
| 8,323,612 B2 | * | 12/2012 | Koga et al. ..................... | 423/599 |
| 2008/0254368 A1 | | 10/2008 | Ooyama et al. | |
| 2009/0272940 A1 | * | 11/2009 | Kikuya et al. ............. | 252/182.1 |
| 2010/0288969 A1 | * | 11/2010 | Koga et al. ................. | 252/182.1 |
| 2013/0119307 A1 | * | 5/2013 | Watanabe et al. .......... | 252/182.1 |

FOREIGN PATENT DOCUMENTS

| | | | | |
|---|---|---|---|---|
| EP | 2128915 A1 | * | 12/2009 | ............. C01G 53/00 |
| JP | 6-342657 | | 12/1994 | |
| JP | 6-342657 A | | 12/1994 | |
| JP | 2002-151077 | | 5/2002 | |
| JP | 2002-151077 A | | 5/2002 | |
| JP | 2003-17054 | | 1/2003 | |
| JP | 2003-17054 A | | 1/2003 | |
| JP | 2008-251434 | | 10/2008 | |
| JP | 2008-251434 A | | 10/2008 | |
| JP | 2008251434 A | * | 10/2008 | |
| JP | 2010-64944 | | 3/2010 | |
| JP | 2010-64944 A | | 3/2010 | |

OTHER PUBLICATIONS

International Search Report for PCT/JP2011/063126, mailed Sep. 20, 2011.
English translation of International Preliminary Report on Patentability of PCT/JP2011/063126 dated Jan. 24, 2013.

* cited by examiner

*Primary Examiner* — Nicole M Buie-Hatcher
*Assistant Examiner* — Mohammad Asdjodi
(74) *Attorney, Agent, or Firm* — Nixon & Vanderhye P.C.

(57) ABSTRACT

The present invention aims to provide lithium composite compound particles which can exhibit good cycle characteristics and an excellent high-temperature storage property when used as a positive electrode active substance of a secondary battery, and a secondary battery using the lithium composite compound particles. The present invention relates to lithium composite compound particles having a composition represented by the compositional formula: $Li_{1+x}Ni_{1-y-z-a}Co_yMn_zM_aO_2$, in which the lithium composite compound particles have an ionic strength ratio A ($LiO^-/NiO_2^-$) of not more than 0.5 and an ionic strength ratio B ($Li_3CO_3^+/Ni^+$) of not more than 20 as measured on a surface of the respective lithium composite compound particles using a time-of-flight secondary ion mass spectrometer.

11 Claims, 4 Drawing Sheets

LITHIUM COMPOSITE COMPOUND PARTICLES AND PROCESS FOR PRODUCING THE SAME, AND NON-AQUEOUS ELECTROLYTE SECONDARY BATTERY

This application is the U.S. national phase of International Application No. PCT/JP2011/063126, filed 8 Jun. 2011, which designated the U.S. and claims priority to Japan Application No. 2010-132392, filed 9 Jun. 2010, the entire contents of each of which are hereby incorporated by reference.

TECHNICAL FIELD

The present invention relates to lithium composite compound particles which are capable of exhibiting good cycle characteristics, a good thermal stability and an excellent high-temperature storage property when used as a positive electrode (cathode) active substance of secondary batteries, and a secondary battery using the lithium composite compound particles.

BACKGROUND ART

With the recent rapid development of portable and cordless electronic devices such as audio-visual (AV) devices and personal computers, there is an increasing demand for secondary batteries or cells having a small size, a light weight and a high energy density as a power source for driving these electronic devices. Also, in consideration of global environments, electric cars and hybrid cars have been recently developed and put into practice, so that there is an increasing demand for lithium ion secondary batteries for large size applications having excellent storage characteristics. Under these circumstances, the lithium ion secondary batteries having advantages such as a large charge/discharge capacity and good storage characteristics have been noticed.

Hitherto, as positive electrode active substances useful for high energy-type lithium ion secondary batteries having a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among these secondary batteries using these active substances, lithium ion secondary batteries using $LiNiO_2$ have been noticed because they have a large charge/discharge capacity thereof. However, these materials tend to be deteriorated in thermal stability upon charging and charge/discharge cycle durability, and, therefore, it has been required to further improve properties thereof.

One of factors causing deterioration of characteristics of the positive electrode active substances is considered to reside in impurities which are present on the surface of the respective particles. That is, when a surplus amount of lithium is present on the surface of the particles upon synthesis thereof, undesirable gelation of lithium tends to be caused when forming an electrode therefrom. In addition, when the surplus amount of lithium is subjected to carbonation, generation of a carbon dioxide gas tends to be undesirably caused owing to a reaction within the battery, so that the battery tends to suffer from cell swelling, resulting in deteriorated characteristics of the battery. Further, if sulfates or the like are present on the particles, undesirable increase in resistance value of the battery tends to be caused upon storage.

To solve the above conventional problems, it has been strongly required that the amount of impurities which are present on the surface of the particles is reduced to control the surface condition of the particles, so that side reactions within the battery upon charging and discharging are suppressed, and the particles and the electrode are prevented from being deteriorated in their characteristics to improve cycle characteristics and high-temperature storage property of the resulting battery.

Conventionally, for the purpose of improving various characteristics of the secondary battery, there are known the techniques for improving a capacity of the secondary battery (Patent Documents 1 to 7), the techniques for improving cycle characteristics of the secondary battery (Patent Documents 8 to 10), the techniques for improving a storage property of the secondary battery (Patent Documents 3 and 11), and the techniques for improving a thermal stability of the secondary battery (Patent Documents 5 to 7 and 12) or the like.

PRIOR ART DOCUMENTS

Patent Documents

Patent Document 1: Japanese Patent Application Laid-open (KOKAI) No. 3-64860
Patent Document 2: Japanese Patent Application Laid-open (KOKAI) No. 9-259879
Patent Document 3: Japanese Patent Application Laid-open (KOKAI) No. 2003-17054
Patent Document 4: Japanese Patent Application Laid-open (KOKAI) No. 2004-171961
Patent Document 5: Japanese Patent Application Laid-open (KOKAI) No. 2007-273106
Patent Document 6: Japanese Patent Application Laid-open (KOKAI) No. 2008-117729
Patent Document 7: Japanese Patent Application Laid-open (KOKAI) No. 2008-198363
Patent Document 8: Japanese Patent Application Laid-open (KOKAI) No. 4-328277 (1992)
Patent Document 9: Japanese Patent Application Laid-open (KOKAI) No. 8-138669 (1996)
Patent Document 10: Japanese Patent Application Laid-open (KOKAI) No. 9-17430 (1997)
Patent Document 11: Japanese Patent Application Laid-open (KOKAI) No. 9-231963 (1997)
Patent Document 12: Japanese Patent Application Laid-open (KOKAI) No. 2007-273108

SUMMARY OF THE INVENTION

Problem to be Solved by the Invention

At present, it has been strongly required to provide a positive electrode active substance capable of fulfilling the above properties. However, such a positive electrode active substance has not been obtained until now.

That is, it has been attempted to improve a capacity, cycle characteristics, a storage property and a thermal stability of the secondary battery by washing particles as the positive electrode active substance with water to reduce an amount of impurities which are present on the surface thereof.

In the above method in which a surplus amount of lithium is washed away from the surface of the particles, it will be expected to improve properties of a coating material comprising the particles and suppress occurrence of side reactions within the secondary battery.

However, when the water-washing conditions are inadequate, a part of the surface of the positive electrode active substance tends to metallized, and the metallized portion of the positive electrode active substance tends to be eluted out when repeatedly subjected to charging and discharging, and deposited on a negative electrode, thereby causing deterioration in cycle characteristics of the resulting secondary battery. In addition, lithium tends to be released from an inside of the positive electrode active substance, so that an inherent crystal structure thereof tends to be broken, and the resulting secondary battery tends to be deteriorated in cycle characteristics.

Under these circumstances, an object of the present invention is to provide lithium composite compound particles as a positive electrode active substance which are well controlled in a crystal structure and an amount of impurities present on the surface of the respective particles so as to improve cycle characteristics and a storage property of a secondary battery produced using the particles.

Means for Solving the Problem

The above object and technical task can be achieved by the following aspects of the present invention.

That is, according to the present invention, there are provided lithium composite compound particles having a composition represented by the following compositional formula 1, the particles having an ionic strength ratio A (LiO$^-$/NiO$_2^-$) of not more than 0.5 and an ionic strength ratio B (Li$_3$CO$_3^+$/Ni$^+$) of not more than 20 as measured on a surface of the respective lithium composite compound particles using a time-of-flight secondary ion mass spectrometer (Invention 1).

Compositional formula 1:

wherein M is at least one element selected from the group consisting of Ti, Bi, Sb, Al and Zr; and x, y, z and a satisfy $-0.02 \leq x \leq 0.05$, $0 < y \leq 0.40$, $0 < z \leq 0.40$ and $0 \bullet a \bullet 0.01$, respectively.

Also, according to the present invention, there are provided the lithium composite compound particles as described in Invention 1, wherein the lithium composite compound particles have an average secondary particle diameter of 1.0 to 30 µm (Invention 2).

Also, according to the present invention, there are provided the lithium composite compound particles as described in Invention 1 or 2, wherein the lithium composite compound particles have a powder pH value of not more than 11.0 as measured in a 2% by weight suspension prepared by dispersing the lithium composite compound particles in water (Invention 3).

Also, according to the present invention, there are provided the lithium composite compound particles as described in any one of Inventions 1 to 3, wherein the lithium composite compound particles have a carbon content of not more than 200 ppm (Invention 4).

Also, according to the present invention, there are provided the lithium composite compound particles as described in any one of Inventions 1 to 4, wherein the lithium composite compound particles have a sulfur content of not more than 100 ppm, an ionic strength ratio C (LiSO$_3^-$/NiO$_2^-$) of not more than 0.4 and a sodium content of not more than 100 ppm (Invention 5).

Also, according to the present invention, there are provided the lithium composite compound particles as described in any one of Inventions 1 to 5, wherein the lithium composite compound particles have a lithium carbonate content of not more than 0.10% by weight and a lithium hydroxide content of not more then 0.15% by weight (Invention 6).

Also, according to the present invention, there are provided the lithium composite compound particles as described in any one of Inventions 1 to 6, wherein the lithium composite compound particles have a specific surface area of 0.05 to 0.70 m$^2$/g (Invention 7).

Further, according to the present invention, there is provided a process for producing the lithium composite compound particles as described in any one of Inventions 1 to 7, comprising the steps of:

(1) washing raw lithium composite compound particles with a water solvent to remove impurities therefrom; and (2) subjecting the lithium composite compound particles treated in the step (1) to heat treatment, a ratio of a total molar amount of lithium to a total molar amount of the transition elements and the element M in the lithium composite compound particles used in the step (1) being not less than 1.00 and not more than 1.10 (Invention 8).

Also, according to the present invention, there is provided the process as described in Invention 8, wherein when suspending the particles in the water solvent in the step (1), an ionic solution comprising the element M is added to deposit the element M on the surface of the respective particles (Invention 9).

Also, according to the present invention, there is provided the process as described in Invention 8 or 9, wherein the heat treatment in the step (2) is conducted in a temperature range of 500 to 850° C. in air or an oxygen atmosphere having a carbonate concentration of not more than 100 ppm (Invention 10).

In addition, according to the present invention, there is provided a non-aqueous electrolyte secondary battery comprising the lithium composite compound particles as described in any one of Inventions 1 to 7 (Invention 11).

Effects of the Invention

The lithium composite compound particles of the present invention are excellent in cycle characteristics and high-temperature storage property when used as a positive electrode active substance of a secondary battery, and therefore can be suitably used as a positive electrode active substance of a secondary battery.

PREFERRED EMBODIMENTS FOR CARRYING OUT THE INVENTION

The construction of the present invention is described in detail below.

First, the lithium composite compound particles according to the present invention are described.

The lithium composite compound particles according to the present invention have a composition represented by the following compositional formula 1:

Compositional formula 1:

wherein M is at least one element selected from the group consisting of Ti, Bi, Sb, Al and Zr; and x, y, z and a satisfy $-0.02 \leq x \leq 0.05$, $0 < y \leq 0.40$, $0 < z \leq 0.40$ and $0 \bullet a \bullet 0.01$, respectively.

The suffixes x, y, z and a are more preferably $-0.015 \leq x \leq 0.05$, $0.001 \bullet y \leq 0.40$, $0.001 \bullet z \leq 0.40$ and $0 \bullet a \leq 0.008$, respectively, and still more preferably $-0.01 \leq x \leq 0.04$, $0.01 \bullet y \leq 0.30$, $0.01 \bullet z \leq 0.30$ and $0 \bullet a \leq 0.006$, respectively.

The lithium composite compound particles according to the present invention have an ionic strength ratio A ($LiO^-/NiO_2^-$) of not more than 0.5 as measured on a surface of the respective lithium composite compound particles using a time-of-flight secondary ion mass spectrometer. When the ionic strength ratio A ($LiO^-/NiO_2^-$) of the lithium composite compound particles is more than 0.5, the secondary battery produced using the lithium composite compound particles tends to be deteriorated in cycle characteristics. The ionic strength ratio A ($LiO^-/NiO_2^-$) of the lithium composite compound particles is preferably 0.01 to 0.48 and more preferably 0.05 to 0.45.

The lithium composite compound particles according to the present invention have an ionic strength ratio B ($Li_3CO_3^+/Ni^+$) of not more than 20 as measured on a surface of the respective lithium composite compound particles using a time-of-flight secondary ion mass spectrometer. When the ionic strength ratio B ($Li_3CO_3^+/Ni^+$) of the lithium composite compound particles is more than 20, the secondary battery produced using the lithium composite compound particles tends to be deteriorated in cycle characteristics. The ionic strength ratio B ($Li_3CO_3^+/Ni^+$) of the lithium composite compound particles is preferably 0.1 to 18.0 and more preferably 0.5 to 15.0.

The lithium composite compound particles according to the present invention preferably have an ionic strength ratio C ($LiSO_3/NiO_2^-$) of not more than 0.4 as measured on a surface of the respective lithium composite compound particles using a time-of-flight secondary ion mass spectrometer. When the ionic strength ratio C ($LiSO_3/NiO_2^-$) of the lithium composite compound particles is more than 0.4, the secondary battery produced using the lithium composite compound particles tends to be deteriorated in storage property. The ionic strength ratio C ($LiSO_3/NiO_2^-$) of the lithium composite compound particles is more preferably 0.01 to 0.3 and still more preferably 0.05 to 0.25.

The lithium composite compound particles according to the present invention preferably have an average secondary particle diameter of 1.0 to 30 µm. When the average secondary particle diameter of the lithium composite compound particles is less than 1.0 µm, the resulting particles tend to be undesirably lowered in packing density or increased in reactivity with an electrolyte solution. When the average secondary particle diameter of the lithium composite compound particles is more than 30 µm, the resulting particles tend to be deteriorated in conductivity owing to increase in diffusion distance of lithium ions, and the secondary battery produced using the particles tends to be deteriorated in cycle characteristics, thereby failing to attain the aimed effects of the present invention. The average secondary particle diameter of the lithium composite compound particles is more preferably 2.0 to 20 µm.

The lithium composite compound particles according to the present invention preferably have an average primary particle diameter of not less than 0.1 µm. When the average primary particle diameter of the lithium composite compound particles is less than 0.1 µm, the resulting particles tend to be deteriorated in crystallizability, also resulting in deteriorated cycle characteristics of the secondary battery produced using the particles. When the average primary particle diameter of the lithium composite compound particles is more than 15 µm, the resulting particles tend to suffer from poor diffusion of lithium therein, so that the secondary battery produced using the particles also tends to be deteriorated in cycle characteristics. The average primary particle diameter of the lithium composite compound particles is more preferably 0.1 to 15 µm and still more preferably 0.5 to 12 µm.

The lithium composite compound particles according to the present invention preferably have a powder pH value of not more than 11.0. When the powder pH value of the lithium composite compound particles is more than 11.0, the positive electrode obtained using the particles tends to suffer from deterioration in properties of a coating material therefor, more specifically, the coating material for the positive electrode produced using the lithium composite compound particles tends to have a high viscosity and therefore tends to be deteriorated in dispersibility, so that a current collector obtained therefrom tends to be deteriorated in performance, or the secondary battery produced using the lithium composite compound particles tends to be deteriorated in cycle characteristics and storage property. The powder pH value of the lithium composite compound particles is more preferably not more than 10.8 and still more preferably 9.0 to 10.7.

The lithium composite compound particles according to the present invention preferably have a carbon content of not more than 200 ppm. When the carbon content of the lithium composite compound particles is more than 200 ppm, the secondary battery produced using the lithium composite compound particles tends to be deteriorated in cycle characteristics. The carbon content of the lithium composite compound particles is more preferably 1.0 to 150 ppm.

The lithium composite compound particles according to the present invention preferably have a sulfur content of not more than 100 ppm. When the sulfur content of the lithium composite compound particles is more than 100 ppm, the secondary battery produced using the lithium composite compound particles tends to be deteriorated in storage property. The sulfur content of the lithium composite compound particles is more preferably not more than 50 ppm.

The lithium composite compound particles according to the present invention preferably have a sodium content of not more than 100 ppm. When the sodium content of the lithium composite compound particles is more than 100 ppm, the secondary battery produced using the lithium composite compound particles tends to be deteriorated in cycle characteristics. The sodium content of the lithium composite compound particles is more preferably not more than 50 ppm.

The lithium composite compound particles according to the present invention preferably have a lithium carbonate content of not more than 0.10% by weight. When the lithium carbonate content of the lithium composite compound particles is more than 0.10% by weight, the secondary battery produced using the lithium composite compound particles tends to be deteriorated in cycle characteristics owing to occurrence of side reactions and generation of gases within the secondary battery. The lithium carbonate content of the lithium composite compound particles is more preferably not more than 0.08% by weight.

The lithium composite compound particles according to the present invention preferably have a lithium hydroxide content of not more than 0.15% by weight. When the lithium hydroxide content of the lithium composite compound particles is more than 0.15% by weight, the positive electrode obtained using the lithium composite compound particles tends to suffer from deterioration in properties of a coating material therefor, and the secondary battery produced using the lithium composite compound particles tends to be deteriorated in cycle characteristics. The lithium hydroxide content of the lithium composite compound particles is more preferably not more than 0.13% by weight.

The lithium composite compound particles according to the present invention preferably have a BET specific surface area of 0.05 to 0.7 $m^2/g$. When the BET specific surface area of the lithium composite compound particles is less than 0.05 $m^2/g$, the secondary battery produced using the lithium composite compound particles tends to be deteriorated in cycle characteristics. When the BET specific surface area of the lithium composite compound particles is more than 0.7 $m^2/g$, the secondary battery produced using the lithium composite compound particles tends to be deteriorated in storage property. The BET specific surface area of the lithium composite compound particles is more preferably 0.06 to 0.5 $m^2/g$.

Next, the process for producing the lithium composite compound particles according to the present invention is described.

The lithium composite compound particles according to the present invention can be produced by conducting the process including a step (1) of deaggregating lithium composite compound particles previously prepared and then dispersing the thus deaggregated lithium composite compound particles in water to wash the particles with the water, thereby removing impurities therefrom; and a step (2) of subjecting the lithium composite compound particles obtained in the step (1) to drying and then to heat treatment in a temperature range of 500 to 850° C. in atmospheric air having a carbonate concentration of not more than 100 ppm or in an oxygen atmosphere having a carbonate concentration of not more than 100 ppm.

In the present invention, the lithium composite compound particles to be initially treated in the above process may be produced by an ordinary method. For example, the lithium composite compound particles may be produced by any of the method in which a lithium compound, a nickel compound, a cobalt compound and a manganese compound are mixed with each other, and then the resulting mixture is subjected to heat treatment to thereby obtain the lithium composite compound particles as aimed; the method in which a composite compound comprising nickel, cobalt and manganese is previously formed and then mixed with a lithium compound, and the resulting mixture is subjected to heat treatment; and the method in which a lithium compound, a nickel compound, a cobalt compound and a manganese compound are reacted with each other in a solution thereof.

In addition, the lithium composite compound particles comprising the element M may be produced, for example, by any of the method in which a lithium compound, a nickel compound, a cobalt compound, a manganese compound and an element M-containing compound are mixed with each other, and then the resulting mixture is subjected to heat treatment to thereby obtain the lithium composite compound particles as aimed; the method in which a composite compound comprising nickel, cobalt and manganese is previously prepared and then mixed with an element M-containing compound and a lithium compound, and the resulting mixture is subjected to heat treatment; and the method in which a lithium compound, a nickel compound, a cobalt compound, a manganese compound and an element M-containing compound are reacted with each other in a solution thereof.

Further, when suspending the lithium composite compound particles in the water solvent in the step (1), an ionic solution comprising the element M may be added to deposit the element M on the surface of the respective lithium composite compound particles.

Meanwhile, the lithium composite compound particles to be initially treated preferably have a ratio of a total molar amount of lithium to a total molar amount of transition elements (Ni, Co and Mn) and the element M (Li/(Ni+Co+Mn+M)) of not less than 1.00 and not more than 1.10. When the above ratio is less than 1.00, the resulting lithium composite compound particles tend to be deteriorated in capacity owing to an insufficient reaction between these elements. When the above ratio is more than 1.10, the surplus amount of lithium tends to be undesirably present as a residue. The ratio of a total molar amount of lithium to a total molar amount of transition elements and the element M (Li/(Ni+Co+Mn+M)) in the lithium composite compound particles is more preferably 1.03 to 1.08.

In the present invention, the lithium composite compound particles are preferably subjected to deaggregation before being washed with water.

In the present invention, the lithium composite compound particles are suspended in pure water which is used in such an amount as being not less than 5 times (preferably not less than 8 times) the amount of the lithium composite compound particles in terms of a weight ratio therebetween and maintained at a temperature of not higher than 20° C., and the resulting suspension is filtered and then washed with flowing pure water which may be used in the range of from the same amount as used upon preparing the suspension to an amount being two times that used upon preparing the suspension, preferably in the same amount. The suspension time is preferably within 30 min.

When the amount of pure water used for the washing is too small, the washing of the lithium composite compound particles tends to be insufficient. When the suspension time is too long, the productivity of the lithium composite compound particles tends to be undesirably lowered, and further Li tends to be undesirably released from crystals of the particles. When the temperature of pure water used for the water-washing is too high, release of Li from the particles tends to occur very early. As a result, when the particles are washed with water to remove a surplus amount of Li therefrom, an additional amount of Li tends to be simultaneously released from crystals thereof, so that it may be difficult to well control the composition of the resulting particles. As a result of considering the above viewpoints, the water-washing is preferably conducted using pure water having a temperature of not higher than 20° C. and more preferably not higher than 10° C. (further preferably at a temperature as low as possible in such a range in which the pure water is free from freezing, and still further preferably not lower than 4° C.) within 20 min (preferably 30 sec or longer). The lithium composite compound particles thus washed with water are subjected to filtration, drying and then heat treatment.

In order to stabilize a crystallinity of the surface of the respective particles, it is required to subject the lithium composite compound particles to heat treatment. The heat treatment temperature is 500 to 850° C. When the heat treatment temperature is lower than 500° C., the secondary battery produced using the resulting lithium composite compound particles tends to be deteriorated in storage property. When the heat treatment temperature is higher than 850° C., the secondary battery produced using the resulting lithium composite compound particles tends to be deteriorated in cycle characteristics. The heat treatment temperature is more preferably 600 to 800° C.

The retention time in the heat treatment is preferably 1 to 5 hr. When the retention time is shorter than 1 hr, the crystallinity of the surface of the respective particles tends to be insufficient. When the retention time is longer than 5 hr, the balance between productivity and costs tends to become deteriorated.

The atmosphere used in the heat treatment is either air having a carbonate concentration of not more than 100 ppm or oxygen having a carbonate concentration of not more than 100 ppm. When the carbonate concentration in the atmosphere is more than 100 ppm, the secondary battery produced using the resulting lithium composite compound particles tends to be deteriorated in cycle characteristics. In addition, when conducted in a reducing atmosphere such as nitrogen, release of oxygen tends to be undesirably caused upon the heat treatment.

According to the above production process, it is possible to attain the ionic strength ratio A ($LiO^-/NiO_2^-$), the ionic strength ratio B ($Li_3CO_3^+/Ni^+$), the ionic strength ratio C ($LiSO_3^-/NiO_2^-$), the powder pH value, the carbon content, the sulfur content, the sodium content, the lithium carbonate content and the lithium hydroxide content as defined in the present invention.

Next, a positive electrode produced using the positive electrode active substance comprising the lithium composite compound particles according to the present invention is described.

When producing the positive electrode using the positive electrode active substance according to the present invention, a conducting agent and a binder are added to and mixed with the lithium composite compound particles by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active substance according to the present invention comprises the above positive electrode, a negative electrode and an electrolyte.

Examples of a negative electrode active substance which may be used for production of the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate, lithium borate tetrafluoride and the like in the above solvent.

<Function>

In order to improve cycle characteristics of the secondary battery, it is important to suppress deterioration or degradation on the surface of the lithium composite compound particles forming the positive electrode active substance thereof. In particular, in order to improve the high-temperature storage property of the secondary battery, etc., it is important how to suppress generation of gasses within the secondary battery.

The impurities being present within the secondary battery tend to exert an adverse influence on various characteristics thereof. In particular, the lithium raw materials added in an excess amount upon the reaction and synthesis of the lithium composite compound particles tend to remain in an unreacted state on the surface of the resulting particles to thereby cause a further adverse influence upon producing the secondary battery. In addition, if lithium oxide and lithium hydroxide act as an strong alkali, gelation of the particles upon preparing a coating material thereof tends to occur, or the coating material tends to be deteriorated in storage property. Also, if lithium carbonate is formed, generation of gases tends to occur upon charging within the secondary battery, thereby exerting an adverse influence on cycle characteristics and storage property of the resulting secondary battery. Further, if lithium is present in the form of lithium sulfate on the surface of the respective particles, the resulting secondary battery tends to suffer from increase in impedance upon storage and as a result, tends to be deteriorated in cycle characteristics.

In order to suppress occurrence of the above drawbacks, it is required that residual amounts of the surplus lithium, the sulfate component and the carbonate component in the particles are reduced to as small a level as possible.

However, the nickel-based positive electrode active substance such as $LiNiO_2$ tends to undergo release of lithium even from an inside of the particles when contacted with water, thereby starting breakage of a crystal structure from the surface of the respective particles.

Under these circumstances, in the present invention, in order to suppress occurrence of the above phenomenon, the particles are washed to such an extent as to reduce only a surplus amount of the respective components, and subjected to heat treatment in an atmosphere of decarbonated air or decarbonated oxygen to well control surface properties of the particles. As a result, it is possible to obtain the lithium composite compound particles which have a less content of residual salts such as the surplus lithium and a less carbon dioxide gas adsorption and are well controlled in specific surface area and crystallinity.

If the washing conditions are inadequate, components being present on the surface of the respective particles tend to be partially formed into low-valence components which tend to be eluted out upon charging and discharging and deposited on the negative electrode, so that there tends to arise such a problem that the thus deposited components tend to act as a resistance component upon desorption and insertion of Li, so that cycle characteristics of the resulting battery tend to be deteriorated. To solve these problems, according to the present invention, the surface conditions of the lithium composite compound particles are suitably controlled by measuring ionic strengths of impurities thereon using a time-of-flight secondary ion mass spectrometer (TOF-SIMS), reducing the amounts of the impurities being present on the surface of the respective particles, and stabilizing a crystallinity of the surface of the respective particles. As a result, it is possible to provide a positive electrode active substance for a secondary battery which has good cycle characteristics and an excellent high-temperature storage property.

EXAMPLES

The present invention is described in more detail below by the following examples. However, these examples are only illustrative and not intended to limit the invention thereto. The evaluation methods used in the following examples, etc., are as follows.

The obtained product was identified using a powder X-ray diffractometer (manufactured by RIGAKU Co., Ltd.; Cu—Kα; 40 kV; 40 mA).

The elemental analysis was carried out using a plasma emission spectroscopic device ("SPS 4000" manufactured by Seiko Denshi Kogyo Co., Ltd.).

The average primary particle diameter of the particles was determined using a scanning electron microscope "SEM- EDX" equipped with an energy disperse type X-ray analyzer (manufactured by Hitachi High-Technologies Corp.).

The average secondary particle diameter (D50) of the particles was expressed by a volume-median particle diameter as measured by a wet laser method using a laser type particle size distribution measuring apparatus "LMS-30" manufactured by Seishin Kigyo Co., Ltd.

The surface conditions of the particles were observed using a time-of-flight secondary ion mass spectrometer "TOF-SIMS5" (manufactured by ION-TOF Inc.) to calculate an ionic strength ratio A ($LiO^-/NiO_2^-$), an ionic strength ratio B ($Li_3CO_3^+/Ni^+$) and an ionic strength ratio C ($LiSO_3^-/NiO_2^-$) thereof.

The powder pH value of the particles was determined as follows. That is, 0.5 g of the particles was suspended in 25 mL of distilled water to prepare a 2 wt % dispersion, and then the resulting dispersion was allowed to stand at room temperature to measure a pH value thereof.

The carbon content of the particles was determined as follows. That is, a sample was burnt in an oxygen flow in a combustion furnace to measure a carbon content thereof using a carbon/sulfur measuring apparatus "EMIA-520" manufactured by Horiba Seisakusho Co., Ltd.

The sulfur content of the particles was determined as follows. That is, a sample was burnt in an oxygen flow in a combustion furnace to measure a sulfur content thereof using a carbon/sulfur measuring apparatus "EMIA-520" manufactured by Horiba Seisakusho Co., Ltd.

The sodium content of the particles was determined using a plasma emission spectroscopic device ("SPS 4000" manufactured by Seiko Denshi Kogyo Co., Ltd.).

The contents of lithium carbonate and lithium hydroxide were determined as follow. That is, 20 g of a sample were suspended in 100 mL of pure water in a conical flask, and after hermetically sealing the flask with a plug in an argon (Ar) atmosphere, the resulting suspension was stirred for 20 min using a magnetic stirrer to extract a surplus amount of lithium carbonate and lithium hydroxide in a solvent. The obtained extract was subjected to suction filtration to separate the extract into the sample and a filtrate. The thus obtained filtrate was subjected to titration using hydrochloric acid. The terminal point of the titration was determined using phenolphthalein and Bromocresol Green Methyl as indicators, and the amounts of lithium carbonate and lithium hydroxide in the sample were estimated from the titers thus measured to determine surplus amounts of the respective components.

The BET specific surface area of the particles was measured by BET method using nitrogen.

The battery characteristics of the positive electrode active substance were determined as follows. That is, the positive electrode, negative electrode and electrolyte solution were produced by the following methods, and a coin cell was produced therefrom to evaluate the battery characteristics of the positive electrode active substance.

<Production of Positive Electrode>

The positive electrode active substance, acetylene black as a conducting agent and polyvinylidene fluoride as a binder were accurately weighed such that a weight ratio therebetween was 85:10:5, and fully mixed with each other in a mortar. Then, the resulting mixture was dispersed in N-methyl-2-pyrrolidone to prepare a positive electrode preparation slurry. Next, the thus prepared slurry was applied on an aluminum foil as a current collector to form a coating layer having a thickness of 150 μm, and dried in vacuum at 150° C. The thus obtained coated foil was blanked into a disk shape having a diameter of 16 mmϕ to produce a positive electrode plate.

<Production of Negative Electrode>

A metallic lithium foil was blanked into a disk shape having a diameter of 16 mmϕ to produce a negative electrode.

<Preparation of Electrolyte Solution>

A mixed solution was prepared by mixing ethylene carbonate and diethyl carbonate with each other at a volume ratio of 50:50, and 1 mol/L of lithium phosphate hexafluoride ($LiPF_6$) was mixed in the mixed solution to prepare an electrolyte solution.

<Assembly of Coin Cell>

In a glove box placed in an argon atmosphere, the above positive electrode and negative electrode were arranged through a polypropylene separator in a SUS316 casing, and the electrolyte solution was filled in the casing to produce a coil cell of CR2032 type.

<Evaluation of Battery>

The coin cell thus produced was subjected to charge/discharge test for secondary batteries. The measuring conditions were as follows. That is, the coin cell was repeatedly subjected to charging and discharging cycles at rate of 1.0 C at a cut-off voltage between 3.0 V and 4.3 V. The charging and discharging cycle at a rate of 1.0 C is completed for a short period of time as compared to the charging and discharging cycle at a rate of 0.2, etc., (the cycle time at 1 C is 1 hr whereas the cycle time at 0.2 C is 5 hr), i.e., the charging and discharging cycle at a rate of 1.0 C is carried out at a large current density.

Swelling of the battery was determined as follows. That is, a 500 mAh laminated type cell was produced using a carbon negative electrode. The cell was charged until reaching 4.2 V and stored at 85° C. for 24 hr to measure volumes of the coin cell before and after being stored and calculate a rate of change in volume therebetween.

The increase in resistance of the coin cell was determined as follows. That is, the coin cell was charged until reaching 4.3 V and stored at 60° C. for 4 weeks to measure AC impedance values before and after being stored and calculate a rate of increase in resistance of the cell. The measurement of the impedance values was carried out using an AC impedance measuring device constructed of a 1287-type interface and a 1252A type frequency response analyzer both manufactured by Solartron Co., Ltd.

Example 1

A hydroxide comprising cobalt, nickel and manganese was mixed with lithium carbonate at such a mixing ratio that a molar ratio of Li/(Ni+Co+Mn) was 1.04, and the resulting mixture was calcined at 900° C. in an oxygen atmosphere for 10 hr to thereby obtain lithium composite compound particles. The thus obtained lithium composite compound particles were deaggregated, and 60 g of the deaggregated particles were suspended in 300 mL of pure water maintained at 20° C. The resulting suspension was stirred for 20 min and then subjected to filtration and washing.

The obtained particles were dried at 120° C. over one night, deaggregated again and then subjected to heat treatment in a decarbonated oxygen atmosphere ($CO_2$ concentration: 20 ppm; meanwhile, the $CO_2$ concentration in atmospheric air was 390 ppm) at 800° C. for 5 hr.

Example 2

The particles obtained after the calcination in Example 1 were subjected to washing and drying in the same manner as in Example 1, and the resulting lithium composite compound particles were deaggregated and then subjected to heat treatment in a decarbonated oxygen atmosphere ($CO_2$ concentration: 20 ppm) at 600° C. for 5 hr.

Example 3

A hydroxide comprising cobalt, nickel and manganese was mixed with lithium carbonate at such a mixing ratio that a molar ratio of Li/(Ni+Co+Mn) was 1.02, and the resulting mixture was calcined at 950° C. in air for 10 hr to thereby obtain lithium composite compound particles. Sixty grams of the thus obtained lithium composite compound particles were subjected to washing and drying in the same manner as in Example 1, and the resulting particles were deaggregated and then subjected to heat treatment in a decarbonated oxygen atmosphere ($CO_2$ concentration: 20 ppm) at 800° C. for 5 hr.

Example 4

A hydroxide comprising cobalt, nickel and manganese was mixed with lithium carbonate at such a mixing ratio that a molar ratio of Li/(Ni+Co+Mn) was 1.00, and the resulting mixture was calcined at 890° C. in an oxygen atmosphere for 10 hr to thereby obtain a lithium composite compound. Sixty grams of the thus obtained lithium composite compound particles were subjected to washing and drying in the same manner as in Example 1, and the resulting particles were deaggregated and then subjected to heat treatment in a decarbonated oxygen atmosphere ($CO_2$ concentration: 20 ppm) at 800° C. for 5 hr.

Example 5

A hydroxide comprising cobalt, nickel and manganese was mixed with lithium carbonate at a predetermined mixing ratio, and the resulting mixture was calcined at 890° C. in an oxygen atmosphere for 10 hr to thereby obtain lithium composite compound particles. The thus obtained lithium composite compound particles were deaggregated, and 60 g of the deaggregated particles were suspended in 300 mL of pure water, and sodium aluminate was added to the resulting suspension to adjust a pH value thereof to 9.0, so that a predetermined amount of aluminum was deposited on a surface of the respective particles. The resulting suspension of the particles was washed in the same conditions as used in Example 1, thereby producing lithium composite compound particles having a molar ratio Li/(Ni+Co+Mn+Al) of 1.04.

The obtained particles were dried at 120° C. over one night, deaggregated again and then subjected to heat treatment in a decarbonated oxygen atmosphere ($CO_2$ concentration: 20 ppm) at 800° C. for 5 hr.

Example 6

A hydroxide comprising cobalt, nickel and manganese was mixed with lithium carbonate at a predetermined mixing ratio, and the resulting mixture was calcined at 890° C. in an oxygen atmosphere for 10 hr to thereby obtain lithium composite compound particles. The thus obtained lithium composite compound particles were deaggregated, and 60 g of the deaggregated particles were suspended in 300 mL of pure water, and after adding an alkali to the resulting suspension, a predetermined amount of a titanyl sulfate solution was further added thereto, so that titanium was deposited on a surface of the respective particles. The resulting suspension of the particles was washed in the same conditions as used in Example 1, thereby producing lithium composite compound particles having a molar ratio Li/(Ni+Co+Mn+Ti) of 1.04.

The obtained particles were dried at 120° C. over one night, deaggregated again and then subjected to heat treatment in a decarbonated oxygen atmosphere ($CO_2$ concentration: 20 ppm) at 700° C. for 5 hr.

Example 7

A hydroxide comprising cobalt, nickel and manganese was mixed with bismuth oxide, antimony oxide and lithium carbonate at such a mixing ratio that a molar ratio of Li/(Ni+Co+Mn+Bi+Sb) was 1.04, and the resulting mixture was calcined at 890° C. in an oxygen atmosphere for 10 hr to thereby obtain lithium composite compound particles. Sixty grams of the thus obtained lithium composite compound particles were subjected to washing and drying in the same manner as in Example 1, and the resulting particles were deaggregated and then subjected to heat treatment in a decarbonated oxygen atmosphere ($CO_2$ concentration: 20 ppm) at 800° C. for 5 hr.

Example 8

A hydroxide comprising cobalt, nickel and manganese was mixed with zirconium oxide and lithium carbonate at such a mixing ratio that a molar ratio of Li/(Ni+Co+Mn+Zr) was 1.04, and the resulting mixture was calcined at 890° C. in an oxygen atmosphere for 10 hr to thereby obtain lithium composite compound particles. Sixty grams of the thus obtained lithium composite compound particles were subjected to washing and drying in the same manner as in Example 1, and the resulting particles were deaggregated and then subjected to heat treatment in a decarbonated oxygen atmosphere ($CO_2$ concentration: 20 ppm) at 800° C. for 5 hr.

Example 9

A hydroxide comprising cobalt, nickel and manganese was mixed with bismuth oxide, zirconium oxide and lithium carbonate at such a mixing ratio that a molar ratio of Li/(Ni+Co+Mn+Bi+Zr) was 1.04, and the resulting mixture was calcined at 890° C. in an oxygen atmosphere for 10 hr to thereby obtain lithium composite compound particles. Sixty grams of the thus obtained lithium composite compound particles were subjected to washing and drying in the same manner as in Example 1, and the resulting particles were deaggregated and then subjected to heat treatment in a decarbonated oxygen atmosphere ($CO_2$ concentration: 20 ppm) at 800° C. for 5 hr.

Comparative Example 1

The same procedure as in Example 1 was conducted except that the lithium composite compound particles obtained by the calcination were not subjected to the washing treatment and heat treatment.

Comparative Example 2

The same procedure as in Example 1 was conducted except that the lithium composite compound particles obtained by the calcination were subjected to heat treatment in a decarbonated oxygen atmosphere ($CO_2$ concentration: 20 ppm) at 800° C. for 5 hr without previously subjected to washing treatment.

Comparative Example 3

The same procedure as in Example 3 was conducted except that the lithium composite compound particles obtained by the calcination were not subjected to the washing treatment and heat treatment.

Comparative Example 4

The same procedure as in Example 4 was conducted except that the lithium composite compound particles obtained by the calcination were not subjected to the washing treatment and heat treatment.

Comparative Example 5

A hydroxide comprising cobalt, nickel and manganese was mixed with aluminum oxide and lithium carbonate at such a mixing ratio that a molar ratio of Li/(Ni+Co+Mn+Al) was 1.04, and the resulting mixture was calcined at 890° C. in an oxygen atmosphere for 10 hr to thereby obtain a lithium composite compound. The thus obtained lithium composite compound particles were however not subjected to the washing treatment and heat treatment.

Comparative Example 6

The same procedure as in Example 5 was conducted except that the lithium composite compound particles on the surface of which aluminum was deposited were washed and then dried over one night, and thereafter subjected to heat treatment in a non-decarbonated oxygen atmosphere at 800° C. for 5 hr.

Comparative Example 7

The same procedure as in Example 5 was conducted except that the lithium composite compound particles on the surface of which aluminum was deposited were washed and then dried over one night, and thereafter subjected to heat treatment in an atmosphere of non-decarbonated air at 800° C. for 5 hr.

Comparative Example 8

The same procedure as in Example 6 was conducted except that the lithium composite compound particles on the surface of which titanium was deposited were washed and then dried over one night, but thereafter not subjected to the washing treatment and heat treatment.

Comparative Example 9

The same procedure as in Example 8 was conducted except that the lithium composite compound particles obtained by the calcination were not subjected to the washing treatment and heat treatment.

Production conditions used in the above Examples and Comparative Examples are shown in Table 1, the compositional ratios of the resulting lithium composite compound particles are shown in Table 2, and various properties of the lithium composite compound particles are shown in Table 3.

TABLE 1

| Examples and Comp. Examples | Li/metal elements ratio before washing | Washing treatment Washing with water (—) | Heat treatment Temp. (° C.) | Atmosphere Kind | Decarbonation |
|---|---|---|---|---|---|
| Example 1 | 1.04 | Done | 800 | Oxygen | ◯ |
| Example 2 | 1.04 | Done | 600 | Oxygen | ◯ |
| Example 3 | 1.02 | Done | 800 | Oxygen | ◯ |
| Example 4 | 1.00 | Done | 800 | Oxygen | ◯ |
| Example 5 | 1.04 | Done | 800 | Oxygen | ◯ |
| Example 6 | 1.04 | Done | 700 | Oxygen | ◯ |
| Example 7 | 1.04 | Done | 800 | Oxygen | ◯ |
| Example 8 | 1.04 | Done | 800 | Oxygen | ◯ |
| Example 9 | 1.04 | Done | 800 | Oxygen | ◯ |
| Comp. Example 1 | 1.04 | None | — | — | — |
| Comp. Example 2 | 1.04 | None | 800 | Oxygen | ◯ |
| Comp. Example 3 | 1.02 | None | — | — | — |
| Comp. Example 4 | 1.04 | None | — | — | — |
| Comp. Example 5 | 1.04 | None | — | — | — |
| Comp. Example 6 | 1.04 | Done | 800 | Oxygen | X |
| Comp. Example 7 | 1.04 | Done | 800 | Air | X |
| Comp. Example 8 | 1.04 | None | — | — | — |
| Comp. Example 9 | 1.04 | None | — | — | — |

TABLE 2

| Examples and Comp. Examples | Compositional ratio: $Li_{1+x}Ni_{1-y-z-a}Co_yMn_zM_aO_2$ | | | | |
|---|---|---|---|---|---|
| | x | y | z | M | a |
| Example 1 | 0.04 | 0.20 | 0.20 | — | 0.000 |
| Example 2 | 0.04 | 0.20 | 0.20 | — | 0.000 |
| Example 3 | 0.02 | 0.20 | 0.30 | — | 0.000 |
| Example 4 | 0.00 | 0.20 | 0.20 | — | 0.000 |
| Example 5 | 0.04 | 0.20 | 0.20 | Al | 0.002 |
| Example 6 | 0.04 | 0.20 | 0.20 | Ti | 0.005 |
| Example 7 | 0.04 | 0.20 | 0.20 | Bi, Sb | 0.002 |
| Example 8 | 0.04 | 0.20 | 0.20 | Zr | 0.002 |
| Example 9 | 0.04 | 0.20 | 0.20 | Zr, Bi | 0.004 |
| Comp. Example 1 | 0.04 | 0.20 | 0.20 | — | 0.000 |
| Comp. Example 2 | 0.04 | 0.20 | 0.20 | — | 0.000 |
| Comp. Example 3 | 0.02 | 0.20 | 0.30 | — | 0.000 |
| Comp. Example 4 | 0.04 | 0.20 | 0.20 | — | 0.000 |
| Comp. Example 5 | 0.04 | 0.20 | 0.20 | Al | 0.002 |
| Comp. Example 6 | 0.04 | 0.20 | 0.20 | Al | 0.002 |
| Comp. Example 7 | 0.04 | 0.20 | 0.20 | Al | 0.002 |
| Comp. Example 8 | 0.04 | 0.20 | 0.20 | Ti | 0.005 |
| Comp. Example 9 | 0.04 | 0.20 | 0.20 | Zr | 0.002 |

| Examples and Comp. Examples | Compositional formula |
|---|---|
| Example 1 | $Li_{1.04}Ni_{0.60}Co_{0.20}Mn_{0.20}O_2$ |
| Example 2 | $Li_{1.04}Ni_{0.60}Co_{0.20}Mn_{0.20}O_2$ |

TABLE 2-continued

| | |
|---|---|
| Example 3 | $Li_{1.02}Ni_{0.50}Co_{0.20}Mn_{0.30}O_2$ |
| Example 4 | $Li_{1.00}Ni_{0.60}Co_{0.20}Mn_{0.20}O_2$ |
| Example 5 | $Li_{1.04}Ni_{0.598}Co_{0.20}Mn_{0.20}Al_{0.002}O_2$ |
| Example 6 | $Li_{1.04}Ni_{0.595}Co_{0.20}Mn_{0.20}Ti_{0.005}O_2$ |
| Example 7 | $Li_{1.04}Ni_{0.598}Co_{0.20}Mn_{0.20}Bi_{0.0018}Sb_{0.0002}O_2$ |
| Example 8 | $Li_{1.04}Ni_{0.598}Co_{0.20}Mn_{0.20}Zr_{0.002}O_2$ |
| Example 9 | $Li_{1.04}Ni_{0.596}Co_{0.20}Mn_{0.20}Bi_{0.002}Zr_{0.002}O_2$ |
| Comp. Example 1 | $Li_{1.04}Ni_{0.60}Co_{0.20}Mn_{0.20}O_2$ |
| Comp. Example 2 | $Li_{1.04}Ni_{0.60}Co_{0.20}Mn_{0.20}O_2$ |
| Comp. Example 3 | $Li_{1.02}Ni_{0.50}Co_{0.20}Mn_{0.30}O_2$ |
| Comp. Example 4 | $Li_{1.04}Ni_{0.60}Co_{0.20}Mn_{0.20}O_2$ |
| Comp. Example 5 | $Li_{1.04}Ni_{0.598}Co_{0.20}Mn_{0.20}Al_{0.002}O_2$ |
| Comp. Example 6 | $Li_{1.04}Ni_{0.598}Co_{0.20}Mn_{0.20}Al_{0.002}O_2$ |
| Comp. Example 7 | $Li_{1.04}Ni_{0.598}Co_{0.20}Mn_{0.20}Al_{0.002}O_2$ |
| Comp. Example 8 | $Li_{1.04}Ni_{0.595}Co_{0.20}Mn_{0.20}Ti_{0.005}O_2$ |
| Comp. Example 9 | $Li_{1.04}Ni_{0.598}Co_{0.20}Mn_{0.20}Zr_{0.002}O_2$ |

TABLE 3

| | Surface condition data: ionic strength ratios TOF-SIMS | | |
|---|---|---|---|
| Examples and Comp. Examples | $LiO^-/NiO_2^-$ (—) | $Li_3CO_3^+/Ni^+$ (—) | $LiSO_3^-/NiO_2^-$ (—) |
| Example 1 | 0.38 | 6.2 | 0.14 |
| Example 2 | 0.37 | 7.5 | 0.16 |
| Example 3 | 0.36 | 9.3 | 0.15 |
| Example 4 | 0.25 | 6.4 | 0.16 |
| Example 5 | 0.30 | 2.0 | 0.14 |
| Example 6 | 0.38 | 8.8 | 0.13 |
| Example 7 | 0.44 | 7.8 | 0.11 |
| Example 8 | 0.38 | 1.5 | 0.18 |
| Example 9 | 0.43 | 6.3 | 0.15 |
| Comp. Example 1 | 0.59 | 38.9 | 0.68 |
| Comp. Example 2 | 0.64 | 43.0 | 0.66 |
| Comp. Example 3 | 0.57 | 54.3 | 0.63 |
| Comp. Example 4 | 0.62 | 42.3 | 0.70 |
| Comp. Example 5 | 0.72 | 35.8 | 0.60 |
| Comp. Example 6 | 0.35 | 28.2 | 0.15 |
| Comp. Example 7 | 0.42 | 24.0 | 0.11 |
| Comp. Example 8 | 0.52 | 32.7 | 0.56 |
| Comp. Example 9 | 0.52 | 41.5 | 0.60 |

| | Data of particles | | | |
|---|---|---|---|---|
| | Properties | | Surplus components | |
| Examples and Comp. Examples | D50 (μm) | BET (m²/g) | Powder pH (—) | Carbon content (ppm) |
| Example 1 | 12.1 | 0.16 | 10.6 | 126 |
| Example 2 | 12.1 | 0.35 | 10.7 | 140 |
| Example 3 | 12.0 | 0.13 | 10.5 | 146 |
| Example 4 | 11.7 | 0.15 | 10.6 | 87 |
| Example 5 | 12.0 | 0.20 | 10.7 | 75 |
| Example 6 | 12.0 | 0.21 | 10.7 | 118 |
| Example 7 | 12.7 | 0.16 | 10.6 | 107 |
| Example 8 | 12.1 | 0.13 | 10.5 | 98 |
| Example 9 | 12.6 | 0.17 | 10.6 | 114 |
| Comp. Example 1 | 12.1 | 0.21 | 11.3 | 250 |
| Comp. Example 2 | 12.2 | 0.19 | 11.5 | 240 |
| Comp. Example 3 | 12.0 | 0.23 | 11.1 | 303 |
| Comp. Example 4 | 12.1 | 0.21 | 11.3 | 250 |
| Comp. Example 5 | 12.0 | 0.19 | 11.3 | 288 |
| Comp. Example 6 | 12.0 | 0.22 | 10.8 | 208 |
| Comp. Example 7 | 12.0 | 0.21 | 10.8 | 224 |
| Comp. Example 8 | 12.1 | 0.21 | 11.3 | 290 |
| Comp. Example 9 | 12.1 | 0.24 | 11.4 | 308 |

| | Data of particles Surplus components | | | |
|---|---|---|---|---|
| Examples and Comp. Examples | Sulfur content (ppm) | Sodium content (ppm) | LiOH (wt %) | $Li_2CO_3$ (wt %) |
| Example 1 | 24 | 12 | 0.06 | 0.06 |
| Example 2 | 23 | 15 | 0.05 | 0.06 |
| Example 3 | 48 | 26 | 0.04 | 0.07 |
| Example 4 | 44 | 19 | 0.08 | 0.04 |
| Example 5 | 26 | 14 | 0.08 | 0.03 |
| Example 6 | 35 | 17 | 0.11 | 0.06 |
| Example 7 | 1 | 31 | 0.12 | 0.06 |
| Example 8 | 32 | 24 | 0.06 | 0.04 |
| Example 9 | 1 | 29 | 0.11 | 0.06 |
| Comp. Example 1 | 427 | 231 | 0.25 | 0.12 |
| Comp. Example 2 | 398 | 248 | 0.26 | 0.13 |
| Comp. Example 3 | 395 | 192 | 0.24 | 0.14 |
| Comp. Example 4 | 427 | 231 | 0.25 | 0.12 |
| Comp. Example 5 | 407 | 225 | 0.26 | 0.12 |
| Comp. Example 6 | 32 | 10 | 0.08 | 0.08 |
| Comp. Example 7 | 30 | 10 | 0.07 | 0.09 |
| Comp. Example 8 | 388 | 220 | 0.28 | 0.13 |
| Comp. Example 9 | 423 | 247 | 0.22 | 0.11 |

| | Battery evaluation data | | |
|---|---|---|---|
| | Cycle characteristics | Storage property | |
| Examples and Comp. Examples | Retention rate (%) | Swelling (%) | Increase in resistance (%) |
| Example 1 | 91 | 15 | 32 |
| Example 2 | 92 | 12 | 24 |
| Example 3 | 90 | 19 | 47 |
| Example 4 | 90 | 14 | 31 |
| Example 5 | 91 | 12 | 25 |
| Example 6 | 93 | 17 | 27 |
| Example 7 | 92 | 17 | 52 |
| Example 8 | 92 | 12 | 22 |
| Example 9 | 92 | 16 | 43 |
| Comp. Example 1 | 84 | 57 | 115 |
| Comp. Example 2 | 86 | 52 | 122 |
| Comp. Example 3 | 82 | 53 | 173 |
| Comp. Example 4 | 85 | 48 | 90 |

TABLE 3-continued

| | | | |
|---|---|---|---|
| Comp. Example 5 | 85 | 55 | 98 |
| Comp. Example 6 | 82 | 47 | 92 |
| Comp. Example 7 | 79 | 50 | 106 |
| Comp. Example 8 | 85 | 75 | 127 |
| Comp. Example 9 | 84 | 41 | 86 |

Figure 1:
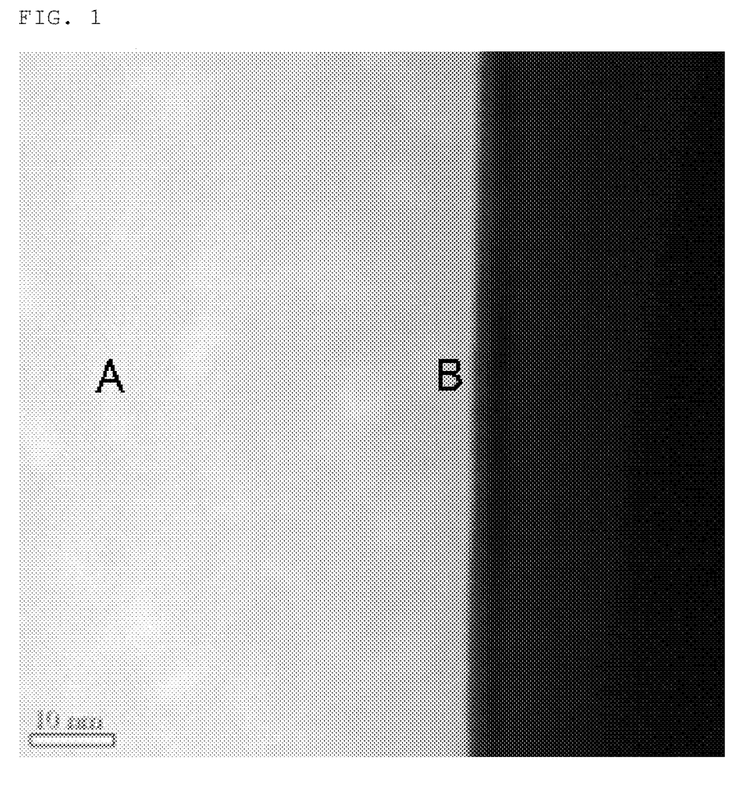
FIG. 1 is an electron micrograph showing an observation position of a section of respective lithium composite compound particles according to the present invention in which A indicates a central portion of the particles whereas B indicates a surface portion of the particles.
Figure 2:
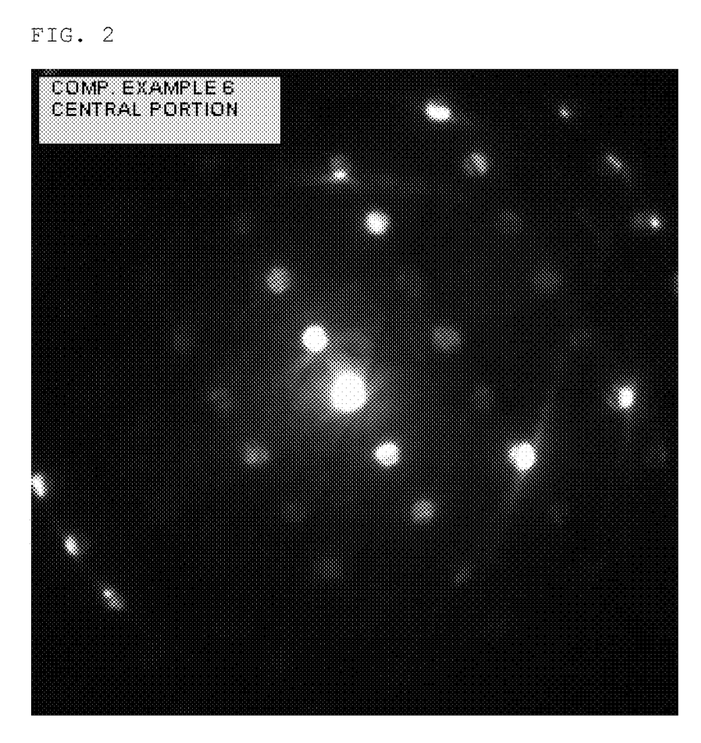
FIG. 2 is an electron diffraction micrograph showing a central portion of the lithium composite compound particles obtained in Comparative Example 6.

The resulting lithium composite compound particles (Example 5 and Comparative Example 6) were respectively embedded in a resin and then subjected to FIB fabrication. Thereafter, the lithium composite compound particles were subjected to nano-ED (electron diffraction) as shown in FIG. 1 to determine the conditions of an inside portion (A in FIG. 1) and a near-surface portion (B in FIG. 1) of the particles. In FIG. 2, there is shown an electron diffraction image of a central portion of the respective lithium composite compound particles obtained in Comparative Example 6, and the electron diffraction image of a central portion of the respective lithium composite compound particles obtained in Example 5 was similar thereto. As a result, it was confirmed that a central portion of any of the sample particles maintained a good crystallinity.

Figure 3:
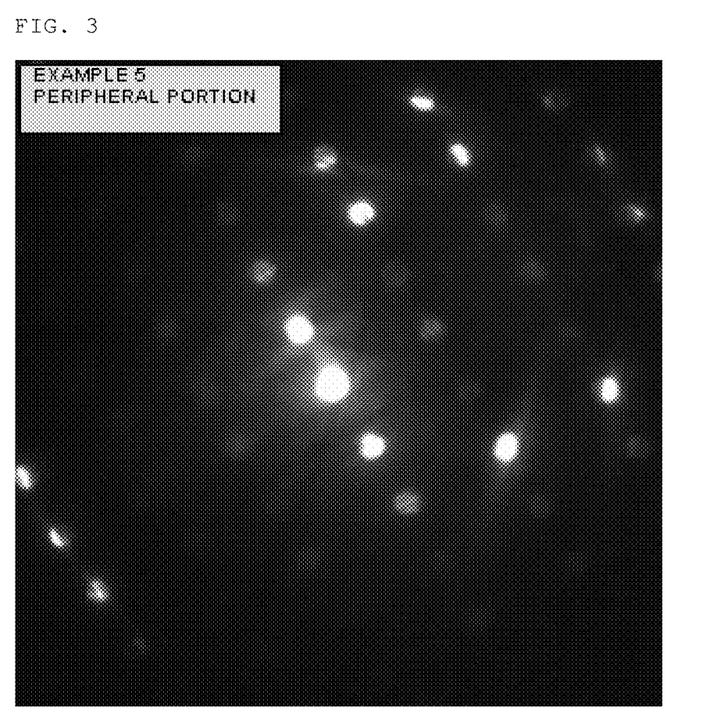
FIG. 3 is an electron diffraction micrograph showing a surface portion of the lithium composite compound particles obtained in Example 5.
Figure 4:
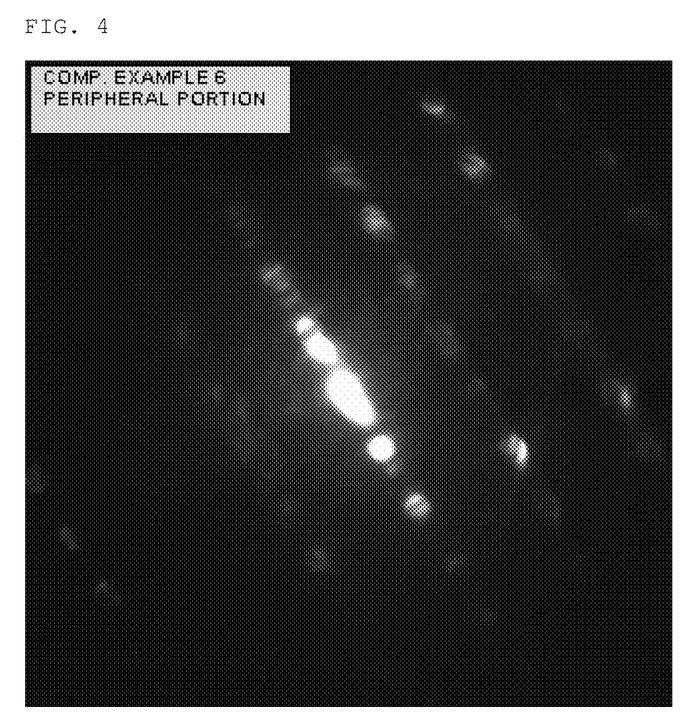
FIG. 4 is an electron diffraction micrograph showing a surface portion of the lithium composite compound particles obtained in Comparative Example 6.

As shown in FIG. 4, it was expected that in the case where the particles were subjected to the heat treatment but treated in a non-decarbonated atmosphere (Comparative Example 6), the resulting particles had a poor crystallinity on the surface thereof so that movement of lithium therein was inhibited. On the other hand, as shown in FIG. 3, it was confirmed that in the case where the particles were subjected to the heat treatment in the decarbonated atmosphere (Example 5), the resulting particles were improved in crystallinity, and the battery produced using the particles were also improved in cycle characteristics.

Thus, the secondary batteries produced using the lithium composite compound particles according to the present invention had good battery characteristics such that a cycle retention rate was not less than 90%; among storage properties, a cell swelling rate was as low as not more than 20%; and further a rate of increase in resistance was as low as not more than 60%.

INDUSTRIAL APPLICABILITY

The lithium composite compound particles according to the present invention are excellent in cycle characteristics and high-temperature storage property required as a positive electrode active substance for secondary batteries, and can be therefore suitably used as the positive electrode active substance for secondary batteries.

The invention claimed is:

1. Lithium composite compound particles having a composition represented by the following compositional formula 1, which particles have an ionic strength ratio A (LiO$^-$/NiO$_2^-$) of not more than 0.5 and an ionic strength ratio B (Li$_3$CO$_3^+$/Ni$^+$) of not more than 20 as measured on a surface of the respective lithium composite compound particles using a time-of-flight secondary ion mass spectrometer:

$$Li_{1+x}Ni_{1-y-z-a}Co_yMn_zM_aO_2 \quad \text{Compositional formula 1:}$$

wherein M is at least one element selected from the group consisting of Ti, Bi, Sb, Al and Zr; and x, y, z and a satisfy $-0.02 \leq x \leq 0.05$, $0 < y \leq 0.40$, $0 < z \leq 0.40$ and $0 \leq a \leq 0.01$, respectively.

2. The lithium composite compound particles according to claim 1, wherein the lithium composite compound particles have an average secondary particle diameter of 1.0 to 30 μm.

3. The lithium composite compound particles according to claim 1, wherein the lithium composite compound particles have a powder pH value of not more than 11.0 as measured in a 2% by weight suspension prepared by dispersing the lithium composite compound particles in water.

4. The lithium composite compound particles according to claim 1, wherein the lithium composite compound particles have a carbon content of not more than 200 ppm.

5. The lithium composite compound particles according to claim 1, wherein the lithium composite compound particles have a sulfur content of not more than 100 ppm, an ionic strength ratio C (LiSO$_3^-$/NiO$_2^-$) of not more than 0.4 and a sodium content of not more than 100 ppm.

6. The lithium composite compound particles according to claim 1, wherein the lithium composite compound particles have a lithium carbonate content of not more than 0.10% by weight and a lithium hydroxide content of not more than 0.15% by weight.

7. The lithium composite compound particles according to claim 1, wherein the lithium composite compound particles have a specific surface area of 0.05 to 0.70 m$^2$/g.

8. A process for producing the lithium composite compound particles as defined in claim 1, comprising the steps of:
   (1) washing raw lithium composite compound particles with a water solvent to remove impurities therefrom; and
   (2) subjecting the lithium composite compound particles treated in the step (1) to heat treatment,
   a ratio of a total molar amount of lithium to a total molar amount of the transition elements and the element M in the lithium composite compound particles used in the step (1) being not less than 1.00 and not more than 1.10.

9. The process according to claim 8, wherein when suspending the particles in the water solvent in the step (1), an ionic solution comprising the element M is added to deposit the element M on the respective particles.

10. The process according to claim 8, wherein the heat treatment in the step (2) is conducted in a temperature range of 500 to 850° C. in air or an oxygen atmosphere having a carbonate concentration of not more than 100 ppm.

11. A non-aqueous electrolyte secondary battery comprising the lithium composite compound particles as defined in claim 1.

* * * * *